United States Patent [19]

Takeuchi et al.

[11] Patent Number: 5,267,154
[45] Date of Patent: Nov. 30, 1993

[54] BIOLOGICAL IMAGE FORMATION AIDING SYSTEM AND BIOLOGICAL IMAGE FORMING METHOD

[75] Inventors: Ryozo Takeuchi, Hitachi; Masao Yanaka, Tokyo; Kenichi Anjyo, Hitachiota; Yoshiaki Usami; Munetoshi Unuma, both of Hitachi; Akio Yajima; Tsuneya Kurihara, both of Tokyo; Joji Nishiyama, Urawa; Tomoyuki Miyata, Kokubunji; Hiroaki Takatsuki, Tokyo, all of Japan

[73] Assignee: Hitachi, Ltd., Tokyo, Japan

[21] Appl. No.: 798,959

[22] Filed: Nov. 27, 1991

[30] Foreign Application Priority Data

Nov. 28, 1990 [JP] Japan ................... 2-322868

[51] Int. Cl.$^5$ ............................... G06F 15/38
[52] U.S. Cl. .................. 364/419.2; 395/119; 395/152; 345/122
[58] Field of Search ............. 364/419; 395/152, 119, 395/120, 135; 434/185, 264, 262, 270, 85, 99, 274; 340/725, 734, 747

[56] References Cited

U.S. PATENT DOCUMENTS

| | | | |
|---|---|---|---|
| 3,510,210 | 12/1967 | Haney | 395/152 |
| 3,747,087 | 7/1973 | Harrison, III et al. | 395/152 |
| 4,952,051 | 8/1990 | Lovell et al. | 352/87 |
| 5,111,409 | 5/1992 | Gasper et al. | 395/152 |

OTHER PUBLICATIONS

"Computer Animation '91", N. Thalmann, et al., Springer-Velag Tokyo 1991, pp. 76–88.
"A Simple Method for Extracting the Natural Beauty of Hair", K. Anjyo, et al., Hitachi, Ltd., Computer Graphics 26, 2, Jul. 1992, pp. 111–120.

Primary Examiner—Roy N. Envall, Jr.
Assistant Examiner—Frantzy Poinvil
Attorney, Agent, or Firm—Antonelli, Terry, Stout & Kraus

[57] ABSTRACT

A biological image formation aiding system and a biological image forming method are provided in which three-dimensional data corresponding to a standard shape of a biological article, standard motion thereof, and a standard material feeling of an outer surface of the biological article are prepared, and a realistic three-dimensional synthesized image of an entire biological article with individuality can be formed simply. The system includes a shape data storage for storing data corresponding to a three-dimensional shape of a biological image; a motion data storage for storing data corresponding to three-dimensional motion of the biological image, a material feeling data storage for storing data corresponding to a three-dimensional material feeling of an outer surface of the biological image; editing/processing units capable of modifying at least one of the data corresponding to the three-dimensional shape of the biological image, the three-dimensional data corresponding to the motion of the biological image, and the data corresponding to the three-dimensional material feeling of the outer surface of the biological image in accordance with a producer's intent; and an output unit responsive to the outputs of the editing/processing unit for synthesizing the data corresponding to the three-dimensional biological image, the data corresponding to the three-dimensional motion of the biological image, and the data corresponding to the three-dimensional material feeling of the outer surface of the biological image after modification with each other to provide synthesized three-dimensional data for a biological image to be produced.

16 Claims, 16 Drawing Sheets

F I G. 16
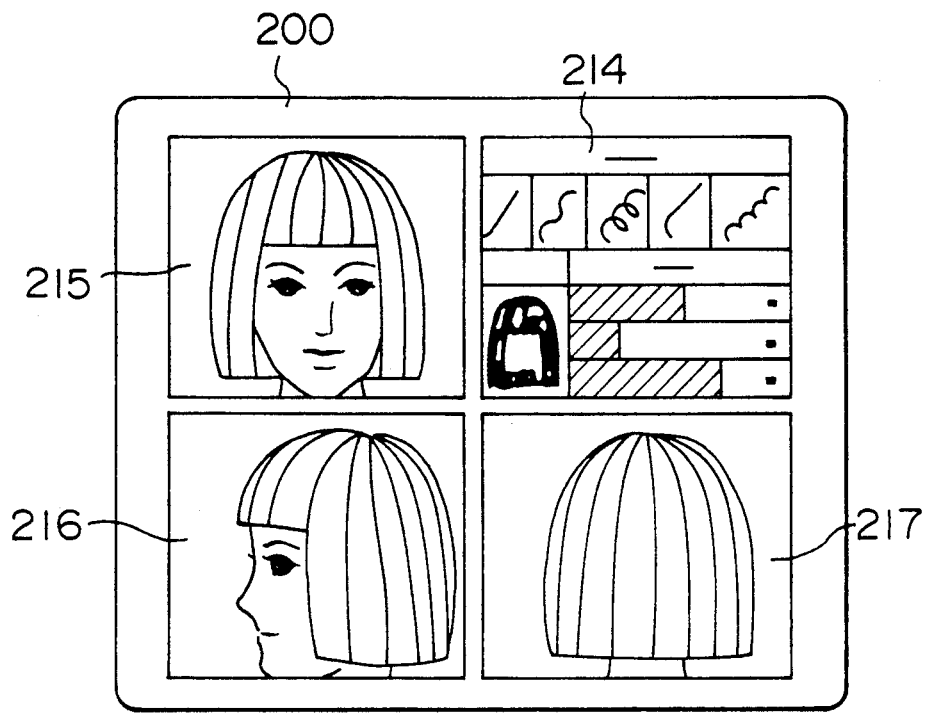
F I G. 17
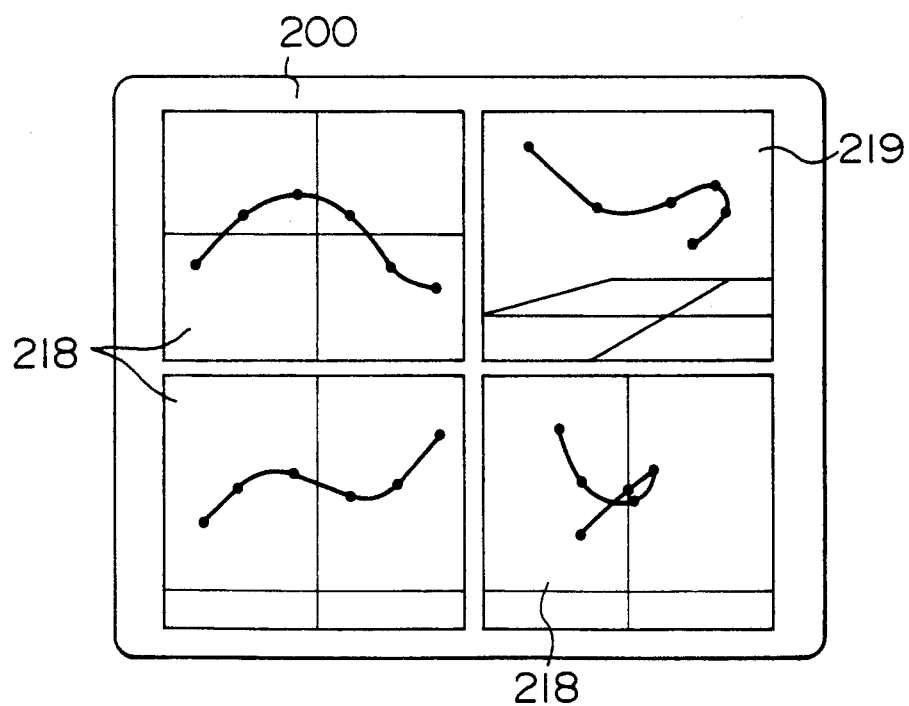

BIOLOGICAL IMAGE FORMATION AIDING SYSTEM AND BIOLOGICAL IMAGE FORMING METHOD

BACKGROUND OF THE INVENTION

The present invention generally relates to a biological image formation aiding system and a biological image forming method for forming a biological image with employment of a computer. More specifically, the present invention is directed to a three-dimensional synthesized biological image formation support system and a biological image forming method suitable for producing a synthesized biological stereoscopic image.

In the conventional biological image formation system, as disclosed in JP-A-02-42581, displacement of the muscle model of the entire biological body is formed to reproduce a biological image. Also, such conventional system is so constructed by the transformation form for achieving muscle displacement from intention/general idea expression and also the individual difference coefficient form for controlling the individual difference to the transformation form, while utilizing the muscle model of the entire biological body.

According to the above-described prior art, no care is taken to a formation of a simple biological image. A shape of a living thing (creature) is considerably complex, as compared with a shape of an imaminate object, so that if the shape of such a living thing would be expressed by merely combining flat planes with curved planes, it should require a large quantity of data. Accordingly, reduction of the total data amount is required by employing the original data format or the original data managing method. Also, the conventional formation system does not clearly disclose how to express a heliotropic movement of a plant, rustling of a plant by window and rain, growing motion of a plant, motion of autumn leaves, and complex movements of an animal. Furthermore, it is known that a living thing may be featured by employing whisker-shaped projections, fur, feather and hair. However, the conventional formation system does not consider that a living thing is simply formed by way of the above-described expression ways including expression of material feelings of outer surfaces thereof. Also, the conventional formation system does not give answers such that a living thing with individuality is newly produced by utilizing the standard shape of the living thing, the standard motion thereof and the standard material feeling of the outer surface thereof.

SUMMARY OF THE INVENTION

The object of the present invention is to provide a biological image formation aiding system and a biological image forming method in which various data about a standard shape of a living thing, standard motion thereof and a standard outer surface's material feeling thereof are prepared, and then a two/three-dimensional synthesized image of an entire living thing with individuality can be realistically formed in a sample manner by utilizing these data.

To achieve the above-described object, according to one aspect of the present invention, there is provided a biological image formation aiding system comprising: a shape data storage unit for storing data corresponding to a shape of a biological image; a motion data storage unit for storing data corresponding to motion of the biological image; an outer surface's material feeling data storage unit for storing data corresponding to the feel of a material of an outer surface of the biological image; an editor for modifying at least one of the data corresponding to the shape of the biological image, the data corresponding to the motion of the biological image, and the data corresponding to the material feeling of the outer surface of the biological image; and an output unit for synthesizing the data corresponding to the biological image, the data corresponding to the motion of the biological image, and the data corresponding to the material feeling of the outer surface of the biological image with each other to provide a synthesized data for forming a biological image to be produced.

In accordance with another aspect of the present invention, standard data regarding the respective constructive elements of a living thing are previously stored in a system, and individualities are furthermore given to these standard data in a simple way. That is to say, in the system according to the present invention, there are provided standard data relating to the material feelings of outer surfaces of living things. These standard data have been expressed by a method, such as a two-dimensional/three-dimensional projection process for giving features of outer skins of the living things and the standard motion data described as functions in a three-dimensional manner. The standard motion data are further described as various scenes of behaviors and motions where the living things are capable of taking. Also, the standard shape data for giving the outer shapes of the living things and also containing expressions, such as the functions of the featured amount thereof other than the expressions of polygon and free curved planes, have been stored in the present system. Furthermore, an editing unit, namely an editor is additionally provided by which the intention of a producer can be reflected with simple modification or corrections of these data, so that a three-dimensional synthesised image of a whole living thing with individuality, which is intended by the producer, can be produced.

In accordance to a further aspect of the present invention, a method for producing a biological image with the aid of a computer, comprises the steps of:

storing data corresponding to a shape of the biological image;

storing data corresponding to motion of the biological image;

storing data corresponding to a material feeling of an outer surface of the biological image;

modifying at least one of the data corresponding to the shape of the biological image, the data corresponding to the motion of the biological image, and the data corresponding to the material feeling of the outer surface of the biological image in accordance with a requirement of a biological image to be produced; and, synthesizing the data corresponding to the shape of the biological image, the data corresponding to the motion of the biological image and the data corresponding to the material feeling of the outer surface of the biological image with each other so as to output a synthesized data for the biological image to be produced.

Operations of the system with the above-described constructions will now be summarized. Based upon the standard shape data for giving the outer shapes of the living things and containing the expressions, such as the functions of the featured amounts of the living things other than expressions of polygons and free curved planes, the data application process is carried out such that, for instance, a shape data on a tiger is formed from a shape data on a cat. The shape data for giving the individuality is formed by utilizing the producer-operated editor for simply modifying the resultant shape data. Also, based on the motion data where possible motion of the living things is described as scenes, or the functions, the motion data for giving the individuality is formed by utilizing the producer-operated editor for simply modifying the first-mentioned motion data. Furthermore, based upon the standard material feeling data on the outer surfaces where the features of the outer skin of the living things are expressed in the three-dimensional fashion by way of the two-dimensional/three-dimensional projection process, the motion data for giving the individuality is produced by utilizing the producer-operated editor for simply modifying the standard material feeling data. As previously described, even when a producer has no initial knowledge, an outer shape of a living thing with individuality can be obtained by employing the standard outer shape data, motion thereof having individuality can be achieved from the standard motion data, and furthermore, the feel of a material of an outer surface with individuality can be acquired from the standard material feeling data about the outer surface. With these process operations, the producer can obtain a truly required three-dimensional synthesized biological image with individuality.

Other objects and features of the present invention will become apparent from the following descriptions on various embodiments.

DESCRIPTION OF THE REFERRED EMBODIMENTS

Figure 1:
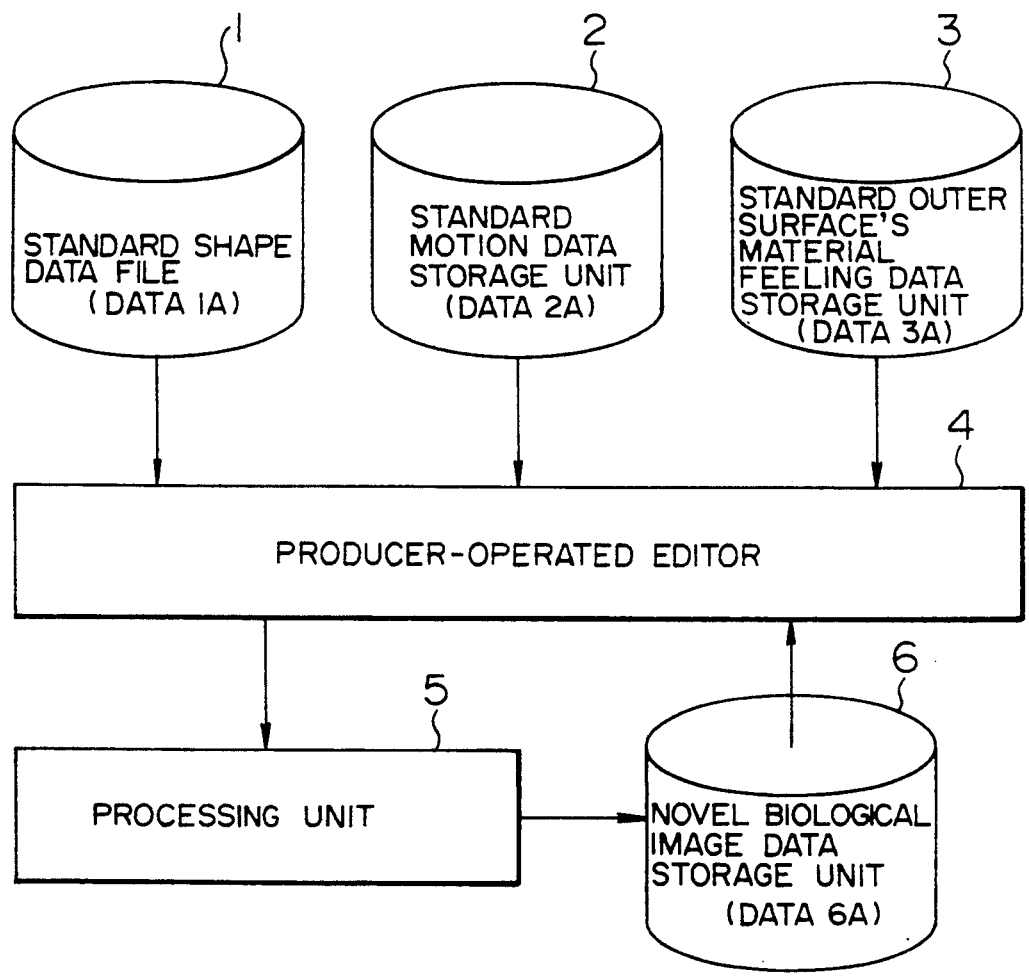
FIG. 1 is a schematic block diagram for showing a system arrangement according to one embodiment of the present invention.

Referring now to accompanying drawings, embodiments of the present invention will be described. FIG. 1 is a schematic block diagram for showing an arrangement of a biological image formation aiding system according an embodiment of the present invention. The biological image formation aiding system shown in FIG. 1 comprises: a shape data storage unit 1 for storing data 1A corresponding to a three dimensional form of a standard biological image; a motion data storage unit 2 for storing data 2A corresponding to three-dimensional motion of the standard biological image; a material-feeling data storage unit 3 of an outer surface, for storing data 3A corresponding to material feeling (the feel of a material) of a three-dimensional outer surface of the standard biological image; an editing unit 4 capable of correcting at least one of the data corresponding to the shape of said biological image, the data corresponding to the motion of said biological image and the data corresponding to the material feeling of the outer surface of said biological image; and an output unit (not shown) for outputting a combination among the data corresponding to the shape of said biological image, the data corresponding to the motion of said biological image, and the image corresponding to the material feeling of the outer surface of said biological body.

Referring to the standard shape data 1A, the standard motion data 2A and the standard outer surface material-feeling data 3A from the producer-operated editor 4, a process for reflecting an individuality intended by the producer to the respective standard data 1A, 2A and 3A is performed in a process unit (processor) 5 and the resultant data is assumed as a novel biological image data 6A, which is stored in a novel biological image data storage unit 6. By applying this data to this process, an image of a novel biological image intended by the producer can be obtained.

Although the standard shape data 1A may be described by a polygon and a free curved surface, these descriptions are not useful, taking into account the amount of data necessary. It is preferable to extract a feature amount of a biological body (a living thing), whereby various sorts of shape data can be produced with feature amounts thereof as a parameter. For instance, there is prepared a conversion function between shape data on a cat and shape data on a tiger, and a conversion function for producing shape data for males and females at various ages, where skeleton data depending on both ages and sex of a human are used as parameter. A large number of modifying applications can be produced from a small number of standard shape data by preparing the above-described conversion functions, as previously explained.

Also, as to the standard motion data 2A, the motion is separated into a basic operation component for individuality and also an emotional component to be recorded; and then if the respective operation components and, the feature amount components of individuality and emotion are combined with each other, taking account of phases and amplitudes, complex operations can be produced. This combination may be achieved by combining amplitudes and phase differences at the respective frequencies, which are obtained by periodic Fourier-transforming, not levels in the real time function, but variations in an angle of a joint during a movement, and by reverse Fourier-transforming the resultant combination.

The standard outer surface material-feeling data 3A may be represented to some extent even by a simple image mapping. However, if the three-dimensional normal data is mapped, more realistic material feeling can be achieved. A whisker-shaped projection, fur, feather and hair and the like can be realized by analogously expressing the projection by lines, and by adding a random number of components which are varied, every single hair can be obtained by assuming a radius thereof.

Thus, a three-dimensional synthesized biological image having individuality may be expressed by way of the standard data which has been prepared above, and the producer-operated editor 4.

Figure 2:
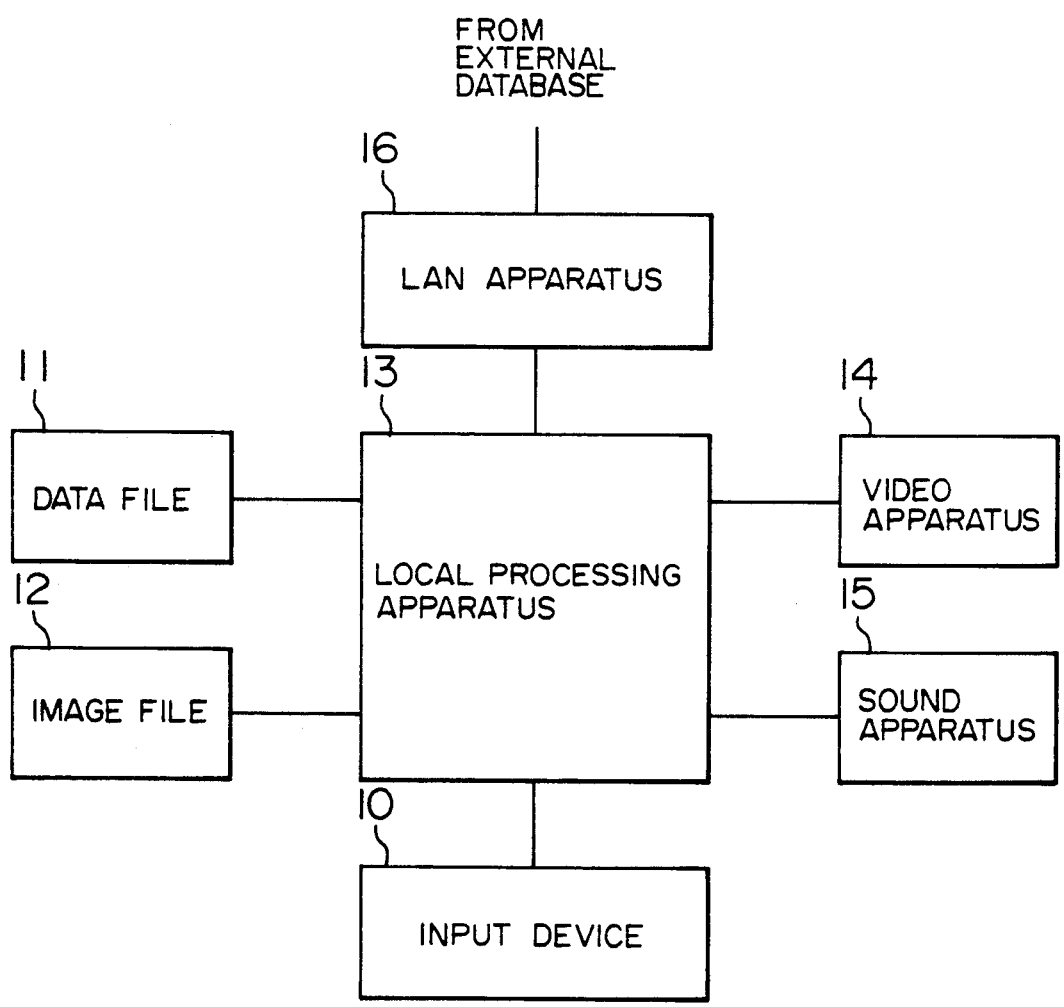
FIG. 2 is a schematic block diagram for representing a hardware system arrangement according to one embodiment of the present invention.

In FIG. 2, there is shown an arrangement of a hardware system constituting one embodiment of the three-dimensional synthesized biological image representation aiding system according to the present invention. A local processing apparatus 13 is employed as a center of this system, a data file 11 is referred to in accordance with various sorts of parameters input from an input device 10, whereby a three-dimensional synthesized biological image is produced. While this biological image is stored within an image file 12, the three-dimensional synthesized biological image is expressed via a video apparatus 14 and a sound (audio) apparatus 15. The standard data has been stored via a data file 11 and a LAN (Local Area Network) apparatus 16 to an external database (not shown), and may be acquired into the local processing apparatus 13, if required. While this data is output to the video apparatus 14 and sound apparatus 15, the intention of the producer is received from the input device 10 and this data is modified in accordance with the received intention. By repeating this stage, the three-dimensional synthesized biological image having individuality and intended by the producer is generated.

The following descriptions will now be made for aiding a formation of a synthesized human image as a subject. However, it is apparent to apply the formation aiding system of the present invention to generic biological images other than the human images, since the technique to produce a human image is substantially equal to the technique to form generic biological images.

Figure 3A:
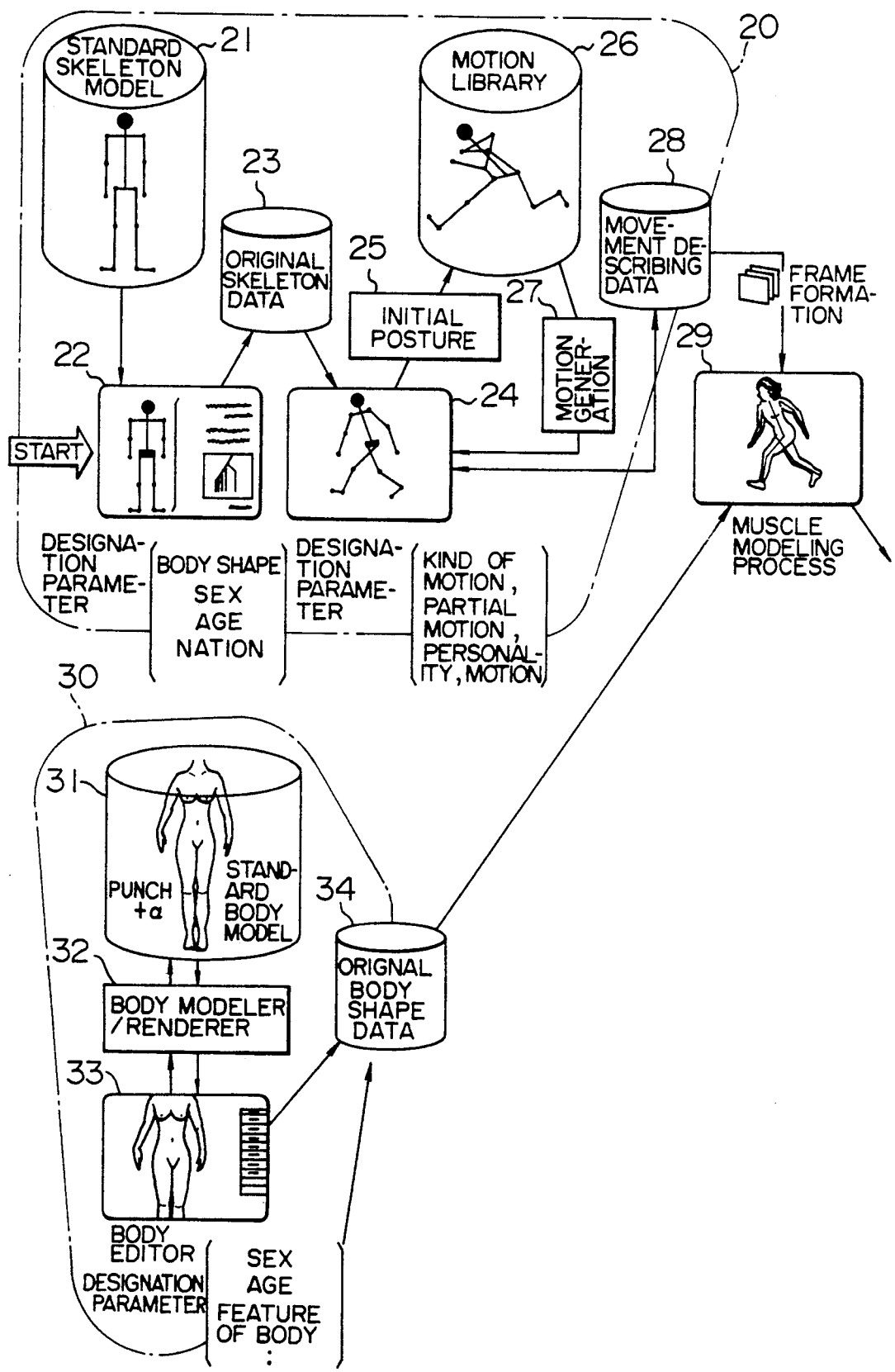
FIGS. 3A to 3C collectivety illustrate a flow diagram for indicating a process flow of one embodiment according to the present invention.
Figure 3B:
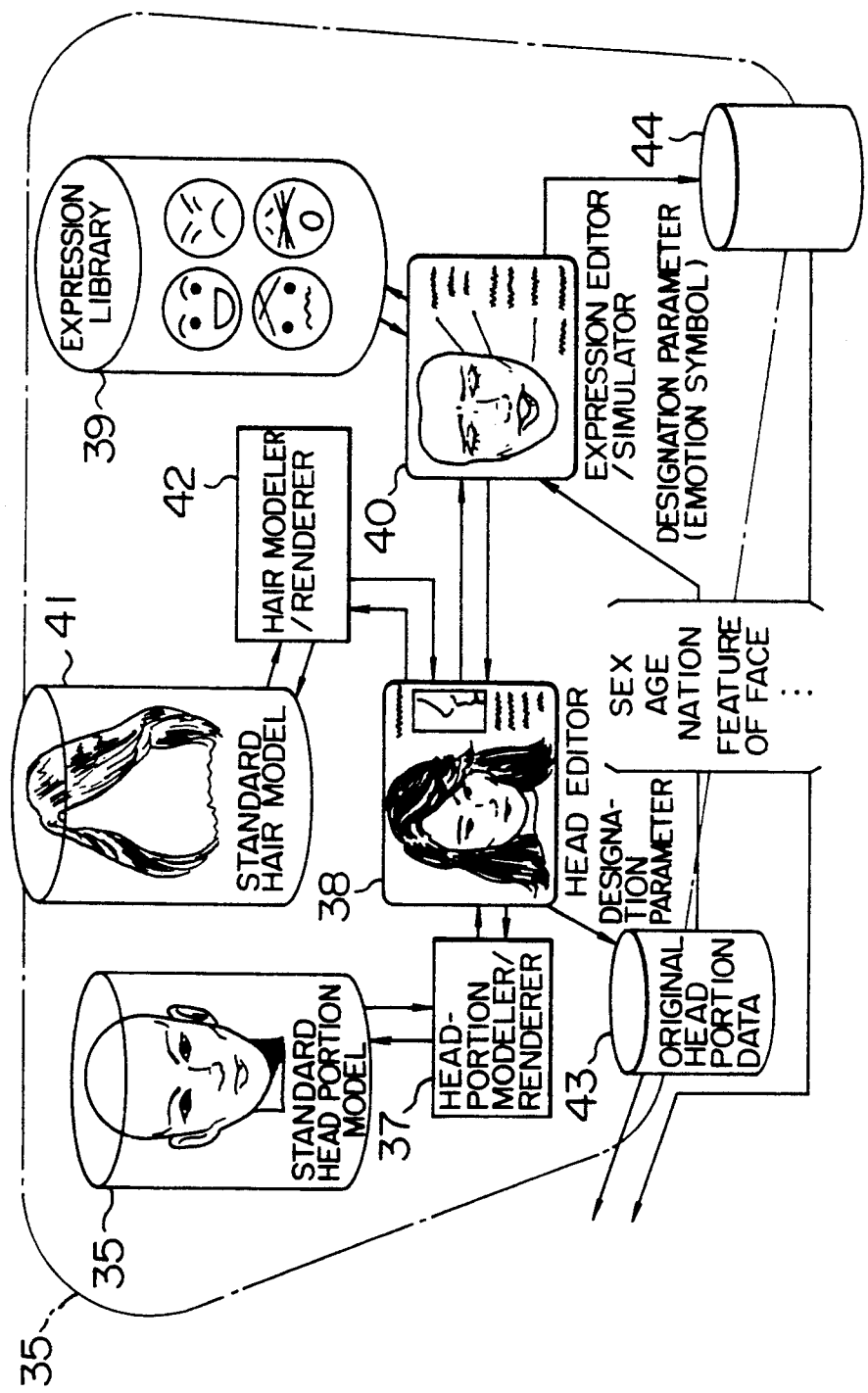
Figure 3C:
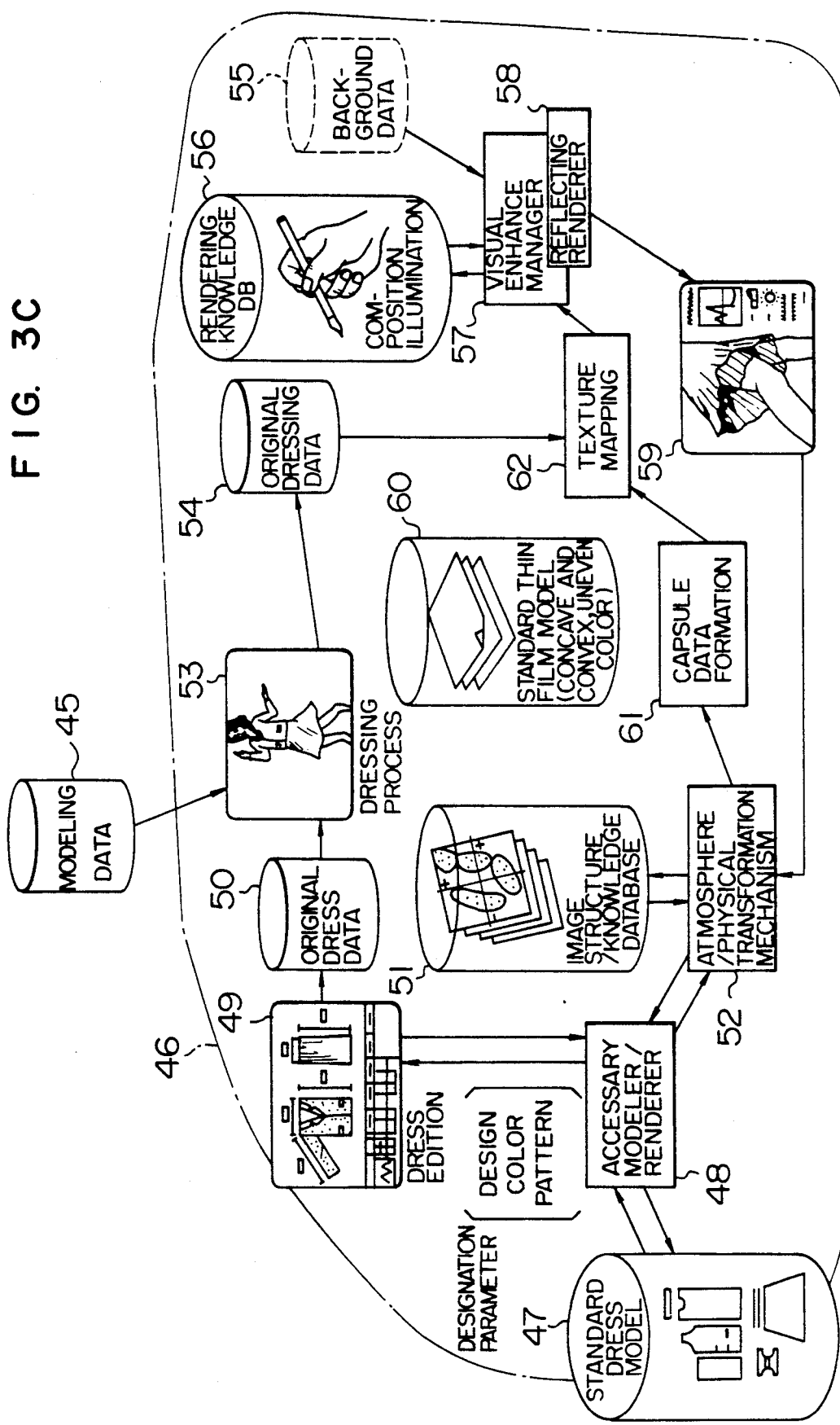

FIGS. 3A-3C represent a process flow to form a human image according to one embodiment of the present invention.

It is so arranged by a part 20 for producing a skeleton and a movement; a part 30 for producing a body shape; a part 35 for producing a head portion; and a part 46 for producing both a dress and a material-feeling. First, a body shape, a sex, an age and a race and the like are designated by employing a skeleton editor 22 from standard skeleton model data which has been stored in a standard skeleton model data storage unit 21 of the skeleton/movement producing part 20, whereby original skeleton data is generated and then stored in an original skeleton data storage unit 23. Furthermore, a movement by a motion generator 27 is generated from a movement library 26 with reference to an initial posture 25 by a movement editor/simulator 24, and the produced movement 27 is modified by way of the movement editor/simulator 24, whereby movement description data is obtained and then stored in a movement description data storage unit 28. Every data frame is transferred to a modeling (refining) process unit, 29 from the movement description data.

Standard body model data is retrieved from a standard body model storage unit 31 of the body-shape producing part 30, and is modified based upon the original skeleton data 23. Moreover, while the retrieved data is pictured at a body modeler/renderer 32, a detailed portion of the standard body model data is modified by a body editor 33 so as to obtain original body shape data having individuality which will be then stored into the original body shape data storage unit 34. This original body shape data is sent to the modeling process unit 29.

Since a head portion is very important in the case of a synthesized human image, a head portion producing part 35 is prepared. In this part, a standard head-portion model storage unit 36 is prepared. The standard head-portion model data stored within this standard head-portion model storage unit 36 is suitably modified via the head-portion modeler/renderer 37 in a head portion editor 38, and is added with an expression formed in the head portion editor 38 by utilizing an expression editor/simulator 40 with reference expression data stored in an expression library 39, so that expression description data is produced and then stored in an expression describing data storage unit 44. This expression describing data can also influence movements of whole body, and this data is sent to the modeling process unit 29. Furthermore with reference to standard hair model data stored in a standard hair model storage unit 41, this expression describing data is imaged in a hair modeler/renderer 42, and then appropriately modified in the head portion editor 38, whereby original head-portion data is formed and thereafter stored in an original head-portion data storage unit 43. Every data frame is sent from the original head-portion data storage unit 43 to the modeling process unit 29.

The respective data which have been produce in these process operations are properly synthesized with each other in the modeling process unit 29 thereby to produce modeling data which will be then stored into the modeling data storage unit 45 and also be transferred to a part 46 for producing a dress and a material feeling.

In the dress/material-feeling producing part 46, while the modeling data is imaged by employing the dress modeler/renderer 48 with reference to the standard dress model data stored in the standard dress model storage unit 47, original dress data is produced at a dress editor 49 and then is stored in an original dress data storage unit 50. Also, a color, pattern and material of a dress are imaged via both an image structure/knowledge database 51 and an atmosphere/physical transformation mechanism 52 by the dress modeler/renderer 48, and then formed while being selected in the dress editor 49. Thus, the obtained original dress data and the modeling data are combined with each other so as to be brought into a dressing process 53. As a result, original dressing data is formed and then stored in an original dressing data storage unit 54.

To obtain a high-degree picture or image, a rendering process is carried out. Although background data 55 is required, since there is no background data itself in a three-dimensional biological image, no detailed explanation thereof is made. Referring to a rendering knowledge database 56, intention of a producer is extracted by an intention extracting man machine 59 in a visual enhance manager 57 and an intention reflecting renderer 58. This image is processed via the atmosphere/physical transformation mechanism 52 in such a manner that a capsule data formation 61 is carried out from standard thin-film model data stored in a standard thin-film model storage unit 60, and also a texture mapping 62 is executed to the original dressing data. The three-dimensional synthesized human image can be produced by these process operations.

Figure 4:
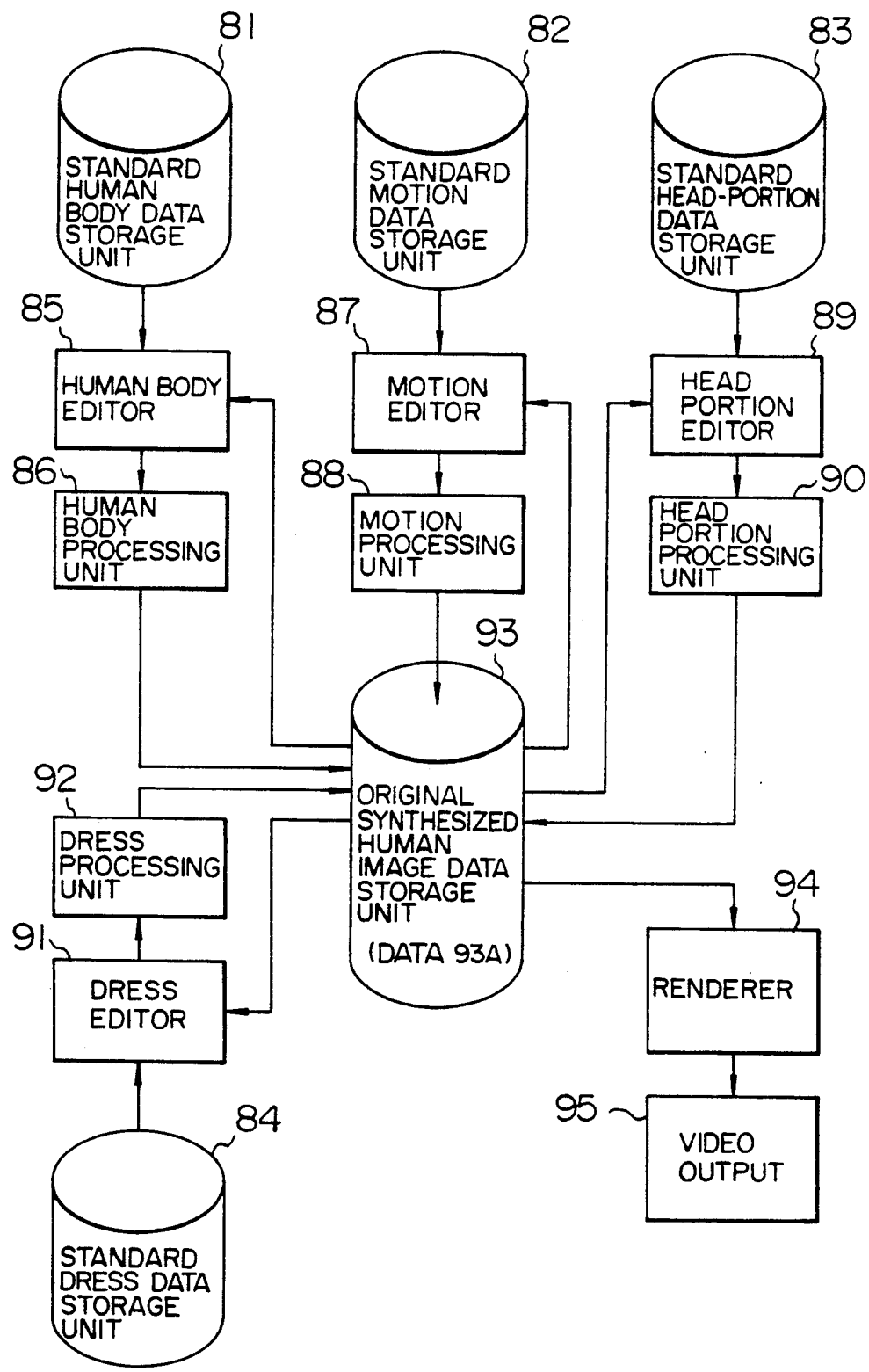
FIGS. 4, 5 and 6 are schematic block diagrams for showing system arrangements according to other embodiments of the present invention.

In FIG. 4, there is shown a three-dimensional synthesized human image formation aiding system according to another embodiment of the present invention.

The aiding system includes a standard human-body data storage unit 81, a standard motion data storage unit 82, a standard head-portion data storage unit 83 and a standard dress data storage unit 84, to which editors and processing units are employed, respectively. That is to say, human body data having individuality intended by a producer is formed in a standard human body data storage unit 81, a human body editor 85 and a human body processing unit 86, and the formed human body data is stored into an original synthesized human-image data storage unit 93. Similarly, individual motion is formed in a motion editor 87 and motion processing unit 88, and the formed motion data is stored into the original synthesized human-image data storage unit 93. Also, individual head portion data is produced in a head-portion editor 89 and a head portion processing unit 90, and the resultant data is stored in the original synthesized human-image data storage unit 93. Furthermore, individual dress data is produced in a dress editor 91 and a dress processing unit 92, and then the produced dress data is stored in the original synthesized human-image data storage unit 93. These produced data are original synthesized human-image data 93A. Although it seems that there is no standard outer surface material-feeling data in the above-described arrangements, standard outer surface material feeling data are contained in the standard head portion data 83, and standard dress data 84, respectively Thus, the formed original synthesized human-image data 93A is imaged by a renderer 94, which will be handled as a video output 95. As previously described, a three-dimensional synthesized human image is produced.

Figure 5:
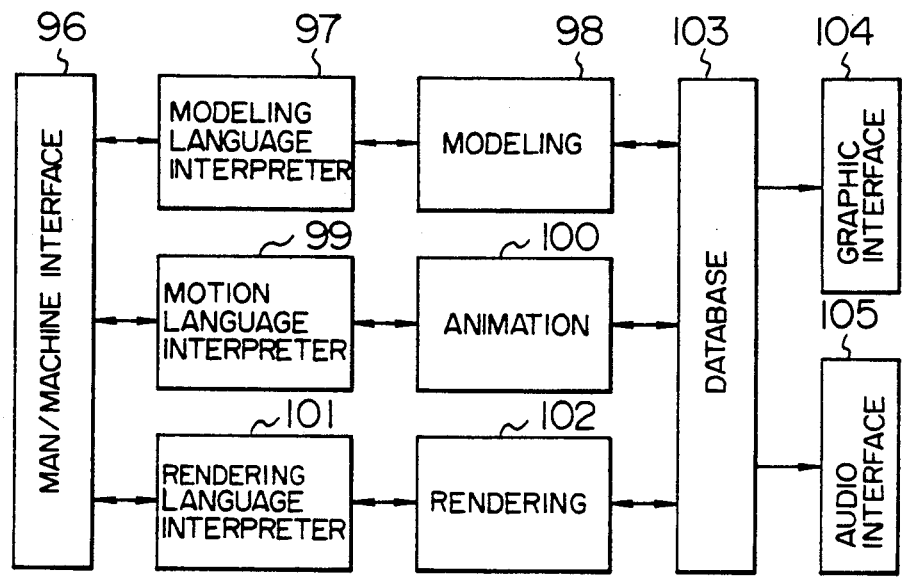

In FIG. 5, there is shown a three-dimensional synthesized human-image formation aiding system according to a further embodiment of the present invention.

Via a man/machine interface, 96, a modeling language, a motion language and a rendering language are input, and thereafter are interpreted by a modeling language interpreter 97, a motion language interpreter 99 and a rendering language interpreter 101, respectively. To these languages, processes such as a modeling 98, animation 100, and rendering 102 are carried out, and the resultant data are outputted to a graphic interface 104 and an audio interface 105. In this case, the database 103 holds the standard human body data, the standard motion data, the standard head-portion data and the standard dress data, and also the original synthesized human-image data is stored in the database 103. In other words, a portion of the above-described editor is stored as the man/machine interface 96, and both the standard data and the original data are wholly managed into the database 103. As a result, although the embodiment is more or less different from the embodiment shown in FIG. 4, a process flow of the embodiment is substantially the same as the previous, embodiment shown in FIG. 4. That is, in similar fashions the human body data is formed, the motion data is produced, and furthermore both the head-portion data and the dress data are separately formed.

Figure 6:
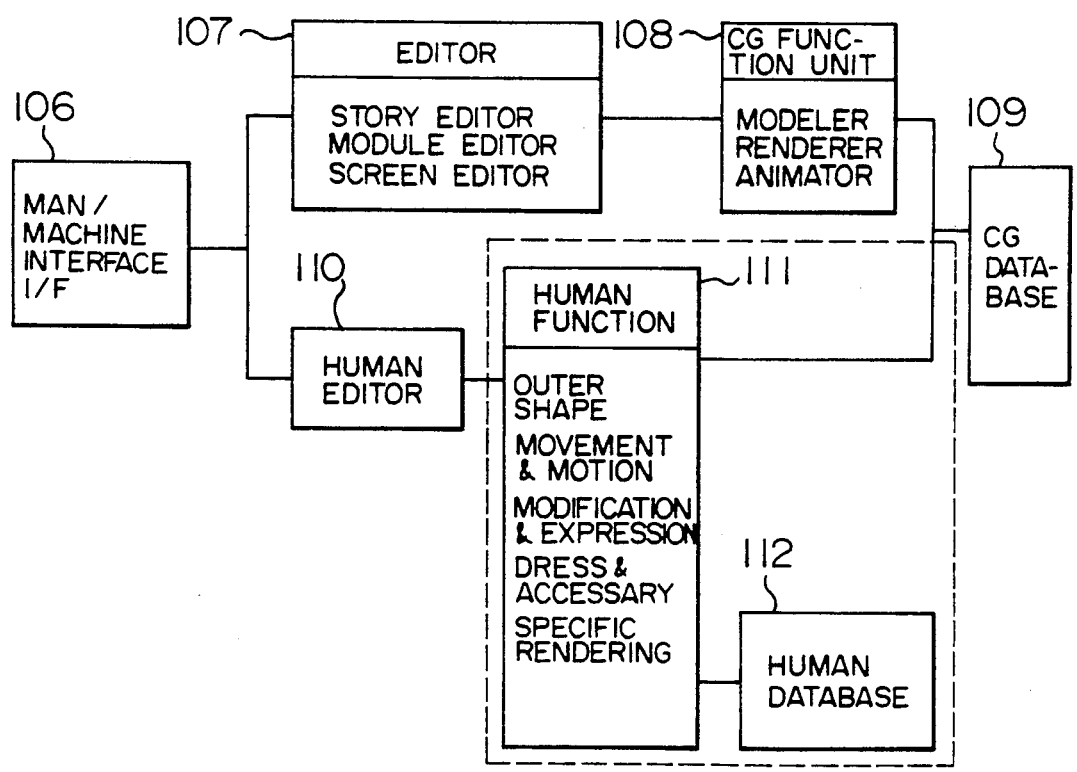

FIG. 6 shows a three-dimensional synthesized human-image formation aiding system according to another embodiment of the present invention.

In this embodiment, it is so arranged that a three-dimensional synthesized human-image generating unit is equipped with a general computer graphics (CG) system. That is, a man/machine interface 106, an editor 107, a CG function unit 108 and a CG database 109 constitute the generic computer graphics system, with which the three-dimensional synthesized human-image generating unit is equipped. The generating unit is constructed of a human editor 110, a human function 111 and a human database 112. This additional part corresponds to FIG. 4.

Figure 7:
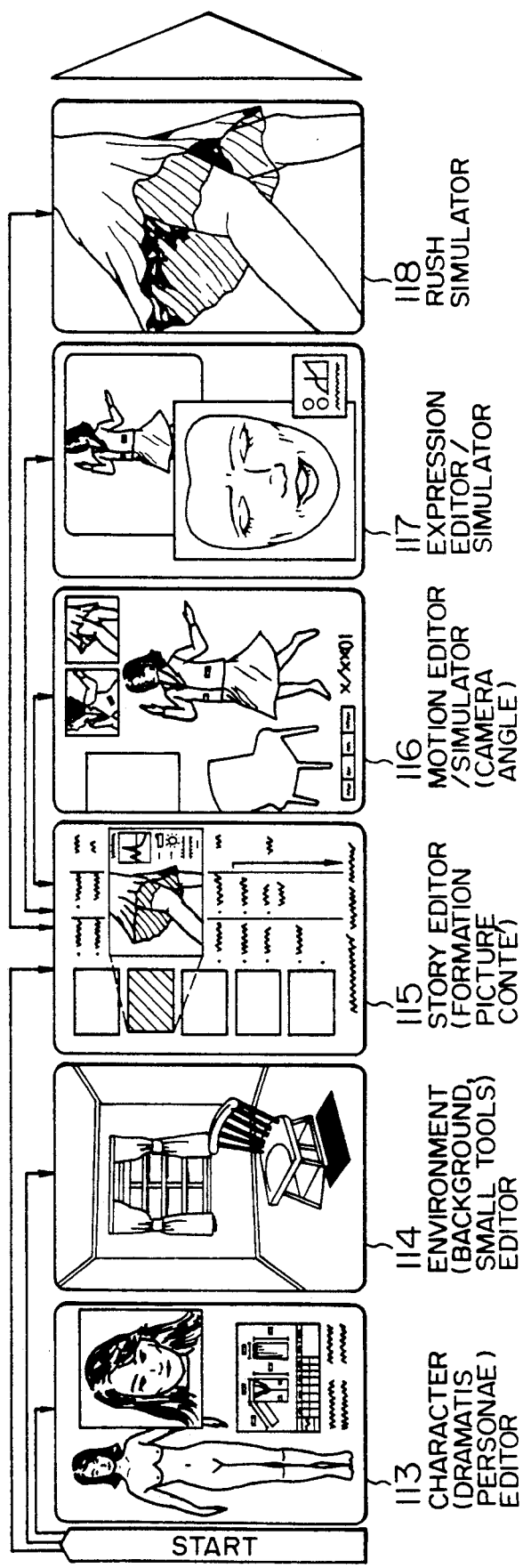
FIG. 7 is an illustration for showing one example of a process for producing a three-dimensional synthesized human image with employment of the system according to the present invention.

In FIG. 7, there are shown examples of display screen of the display units (for example, color CRT display and color liquid crystal display) owned by the respective editors for representing examples of editor's arrangements of the three-dimensional synthesized human-image formation aiding system according to the present invention.

Six sorts of editors are employed. That is to say, they are a character (dramatispersonae) editor 113; an environment (backgrounds, small tools) editor 114; a story editor (formation of picture conte') 115; a motion editor/simulator (camera angle) 116; an expression editor/simulator 117; and a rush simulator 118. First, a story is produced by the story editor (formation of picture conte') 115. Subsequently, characters are formed by the character (dramatispersonae) editor 113. Also, a stage and small tools are formed by the environment (background, small tools) editor 114. The motion and expression of characters are formed by the motion editor/simulator (camera angle) 11 and expression editor/simulator 117 with these articles. A picture is formed, while confirming pictures under formation by the rush simulator 118. It should be noted that the operation sequence of the respective editors is freely decided and therefore any producer may freely determine the operation sequence as they desire. Under such an editing environment, the three-dimensional synthesized biological image with individuality can be produced and also the picture in which the three-dimensional synthesized biological image actively plays can be formed.

Detailed contents of these formations will now be described.

Figure 8:
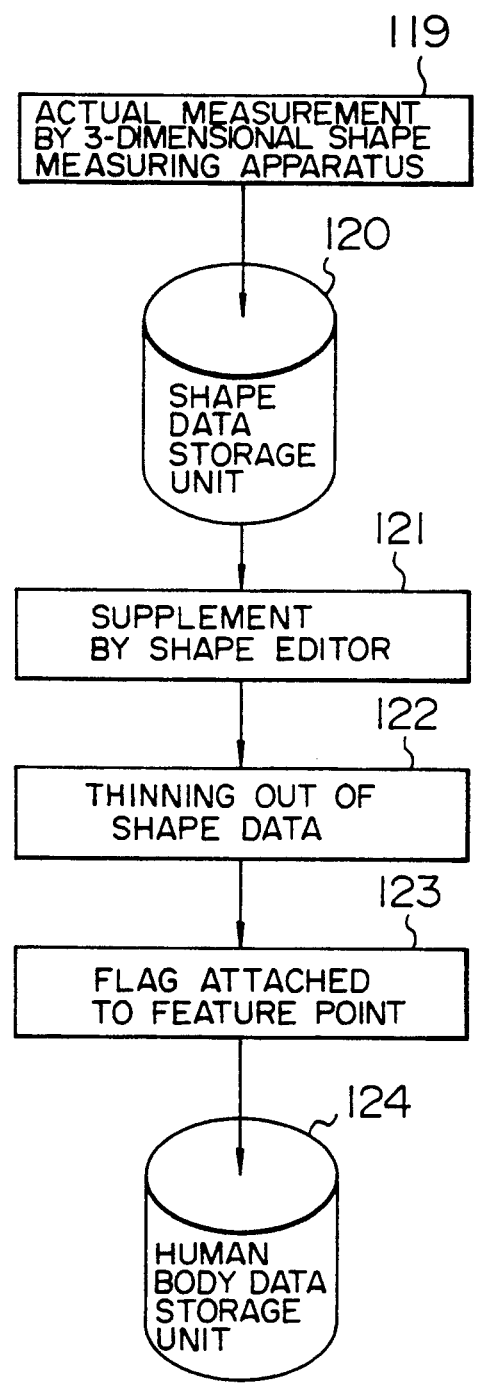
FIG. 8 is a flow diagram for showing one example of a flow operation of acquiring human body shaped data.

First, acquisition of the standard data will now be explained. The standard human body data may be formed by way of a method as shown in FIG. 8. That is to say, a human (biological) body is directly measured, or shape data on an outer surface is gathered, such as a doll by way of an actual measurement process 119 by employing a three-dimensional shape measuring apparatus, thereby obtaining shape data which will be then stored in a shape data storage unit 120. However, since this shape data contains no shadow component, the shadow component must be formed by a supplement process 121 by the shape editor. Furthermore, these components are synthesized so as to produce the human body data. Since there is a tremendous amount of data if the measurement values are utilized without any modification, these data amounts are thinned out by a thinning out process 122 for the shape data until proper data amounts are established. As previously explained, the human body data is formed by the actual measurement process process 119, supplement process 121 and thinning out process 122, and the formed data is stored in the human body data storage unit 124. It should be noted that a flag setting process 123 is carried out for a featured point of point data, such as both edges of an eye and also both edges of a mouth. Thus, the human body data 124 is generated, these human body data may be stored or managed for an entire body, or partial body portions. For instance, the entire human body data are separated into the head portion, body portion, hand portion and leg portion for storage and management purposes.

Next, as to the standard skeleton data, this data may be acquired from a collection of data by which the correct lengths of the respective body portions are obtained, depending upon sex and age groups. The standard human body data is modified using such data.

The standard motion data is measured as, for instance, a picture of actual human motion. A temporal variation is obtained from angles of the respective joints. Then the temporal variation is analyzed with respect to the frequencies thereof, and the resultant data is recorded in the form of amplitudes and phase angles of the respective harmonic frequencies. This method requires a very small amount of recording information, as compared with another method for directly digitizing the waveforms.

Furthermore, complex motion may be achieved by summing the respective motion components. A delicate or fine control may be realized by a ratio of adding the respective motion components, whereby motion with personality may be easily realized.

As to the head portion, as shown in FIG. 3, the standard head portion model, standard hair model and expression library and the like are prepared. Since the standard head portion model is partially separated from the standard human body model and then stored, the forming method has been previously explained. It is difficult to directly measure the standard hair model from a human body. Therefore, various hair styles are produced by a computer, and then a process for displaying an article like hair is additionally performed at the stage of representation. This process can show how hairs appear by changing reflectivities of light under a random number for each of hairs. Furthermore, the expression is classified into approximately 200 sorts of expression. The expression is realized how to move which combination of control points for selecting keypoints of the respective faces. At this time, the control points are determined with reference to the featured points with the flags. As described above, the standard head portion data is formed.

As to the dressing, as shown in FIG. 3, a paper pattern is employed as the standard data. Sizes may be input from the paper patterns where the data used in the sewing industries are utilized. This implies that the sizes may be sequentially input into the system and may be utilized, depending upon requirements. Other data such as the standard capsule model, image structure knowledge database are also required. The standard skin model stores a material feeling of a cloth. For instance, there are a material feeling of silk, a material feeling of hemp and a material feeling of cotton. Also a material feeling of lace may be required. These material feelings may be obtained by directly recording actually taken pictures. Otherwise, in case of coarse fibers, the normal data are mapped which are varied depending upon a diameter of the fiber, and also stereoscopic feelings of the fiber may be enhanced. The image structure knowledge database stores therein a large quantity of colors and patterns, which may be selectively used.

Figure 9:
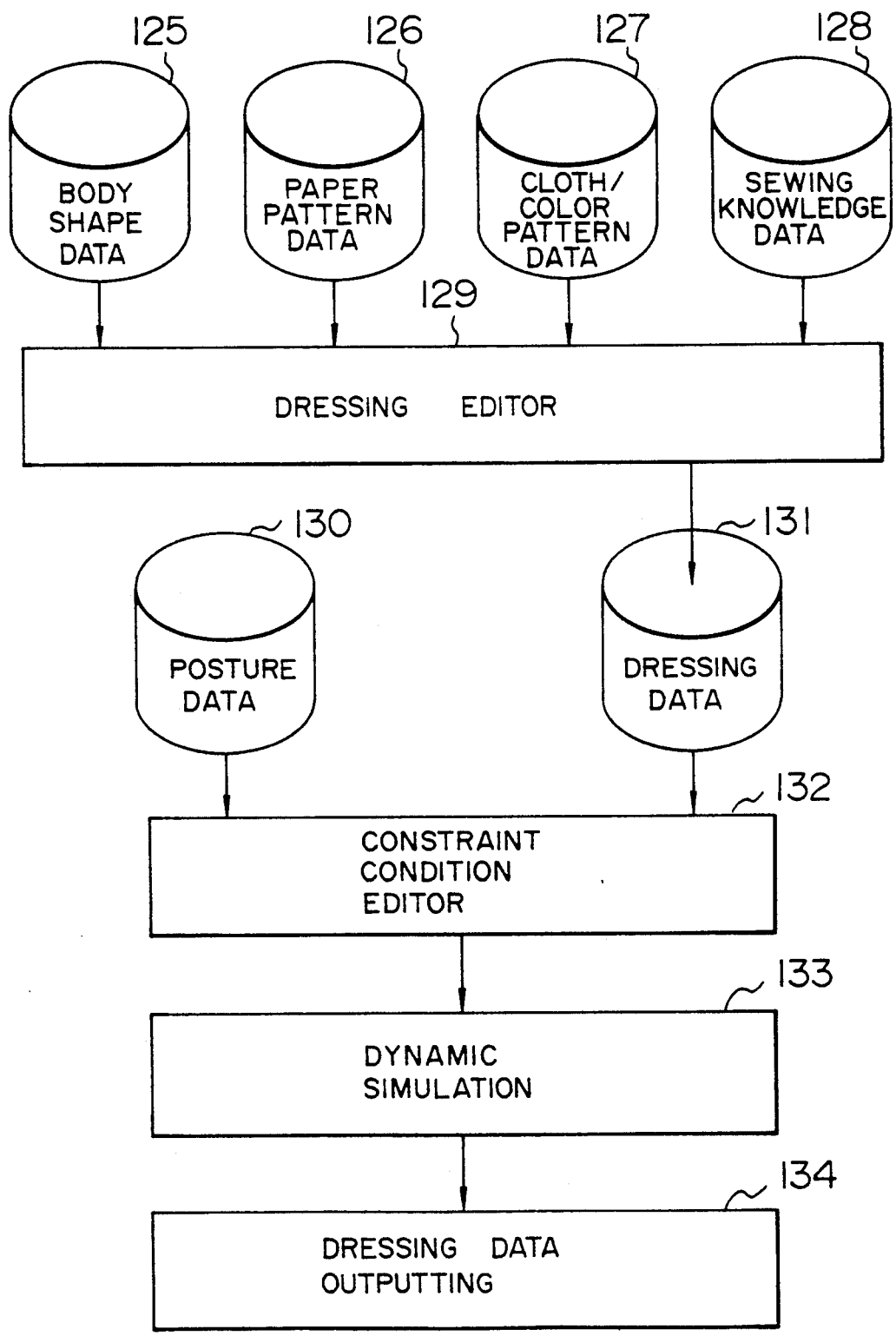
FIG. 9 is a flow diagram for showing one embodiment of a dress data producing unit according to the present invention; and, FIGS. 10 to 21 illustrate samples of screens at an editor's display unit used while forming three-dimensional synthesized human body image, respectively.

In FIG. 9, there is shown a dressing process according to another embodiment of the present invention. The modification, correction and selection are performed by the dressing editor with regard to the body shape data stored in the body shape data storage unit 125; the paper pattern data stored in the paper pattern data storage unit 126; the material feeling of cloth, color and pattern data stored in the material feeling of cloth/color/pattern data storage unit 127; and also the sewing knowledge data stored in the sewing knowledge data storage unit 128, thereby producing dressing data which will be then stored into the dressing data storage unit 131. A paper pattern with individuality is formed by utilizing the body shape data on the dressing human body and the data about sorts of dressings and sewing knowledge, and then the paper pattern data is understood as the dressing data 131A. The dressing data is modified in conformity with the outer shape of the human body and the sewing operation is carried out by making allowances based upon the sewing allowance data stored in the sewing knowledge data 128. These may be realized by the dressing editor 129. On the other hand, the posture data is prepared having been stored in the posture data storage unit 130 and formed by the motion editor, and is mixed with the data stored in the dressing data storage unit 131. Occurrences of wrinkles of clothes which are produced in response to motion of a human body may be calculated by way of a dynamic numerical simulation under a boundary condition of the outer shape of the human body. At this time, such a dynamic numerical calculation is simplified by automatically setting expansion and bending which may be predicted from the material characteristics of the clothes, depending upon the fitting conditions between the clothes and human body. In this case, the dressing operation is carried out in such a manner that stress energy occurring in the respective portions of the cloth becomes a minimum value. However, since the stress energy easily exceeds an allowable elastic range, the conditions of the dressing operation cannot be obtained only by the calculations. As a result, a condition about where the clothes are restricted or constrained is set as an initial condition by a constraint condition editor 132. Based upon this initial constraint condition, the dynamic simulation 133 is executed, which will become a dressing data output 134.

As previously explained, various sorts of standard data are prepared within the system. The three-dimensional synthesized human image with personality is produced with employment of these data.

Subsequently, a description will now be made of a step for producing a three-dimensional synthesized human image with personality by utilizing the standard data. One example of the image forming flow is shown in FIG. 7.

At first, a human body with individuality is formed in the character editor, which is the same as the skeleton/motion producing part 20 and the body shape generating part 30 as shown in FIG. 2. In this example, the individuality is formed in the skeleton editor 22 by employing the standard skeleton model data stored in a standard skeleton model storage unit 21. Since the standard skeleton model storage unit 21 holds various data in accordance with sex, age and race, the desirable standard skeleton data are selected by inputting "race, age, and sex" in languages. Next, the personality such as "height and weight" is given by utilizing the skeleton editor 22. Furthermore, as other personality, the following designations may be made; a width of a human body is wide and a right-hand thereof is long.

Figure 10:
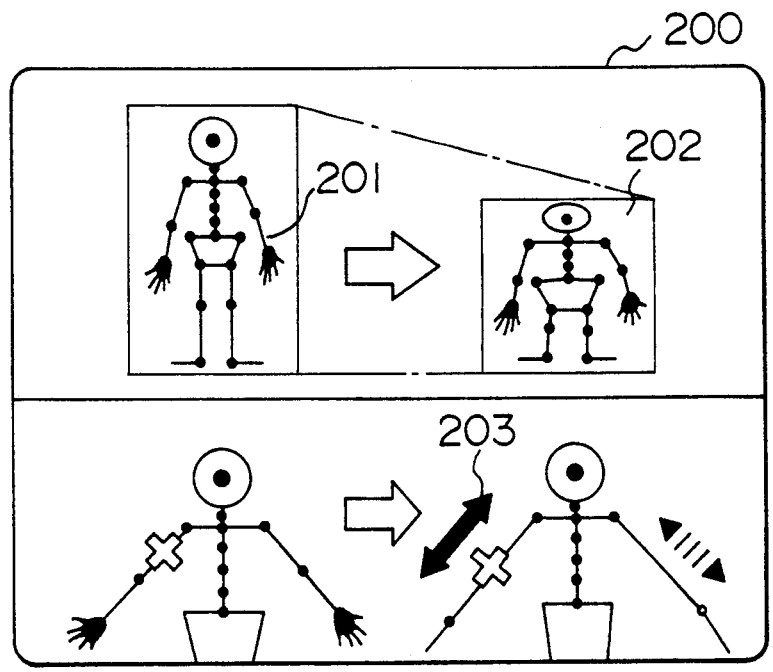

An example of display screen of the display unit for the skeleton editor 22 during the above-described operations is shown in FIG. 10. The original skeleton data having personality is produced by performing a modification process 202, a partial correction 203 and the like with respect to the standard skeleton model data 201 displayed on the screen 200 of the skeleton editor 22. Based upon the original skeleton model data a standard body model data is generated, and furthermore a detailed portion thereof is modified in the body editor 33 so that original body shape data is produced.

Figure 11:
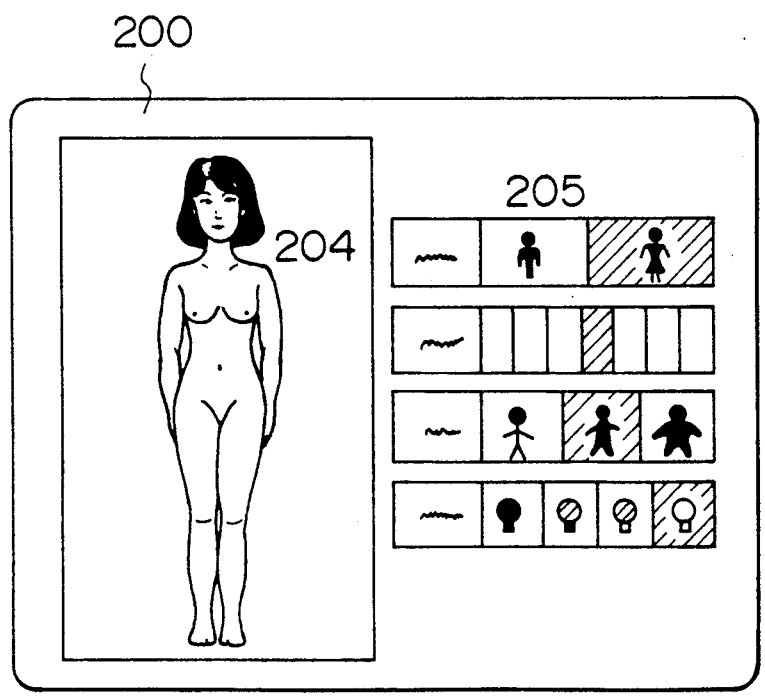

In FIG. 11, there is shown another generating method according to a further embodiment of the present invention. In this case, a firming method starts from a standard body mode 31, not from the skeleton model. An icon 205 is used to select which part of the standard body model data 204 displayed on the screen 200 is changed. For example, such a rough selection is carried out that sex is selected by the topmost icon 205 and a body shape is selected by a third-staged icon, whereby original body shape data 34 is produced. It is of course possible to correct or modify a detailed portion at the shape data level, if required.

Since the thus formed original body shape data 34 are recorded as the original body shape data files, respectively, these body shape data 34 may be again utilized.

Figure 12:
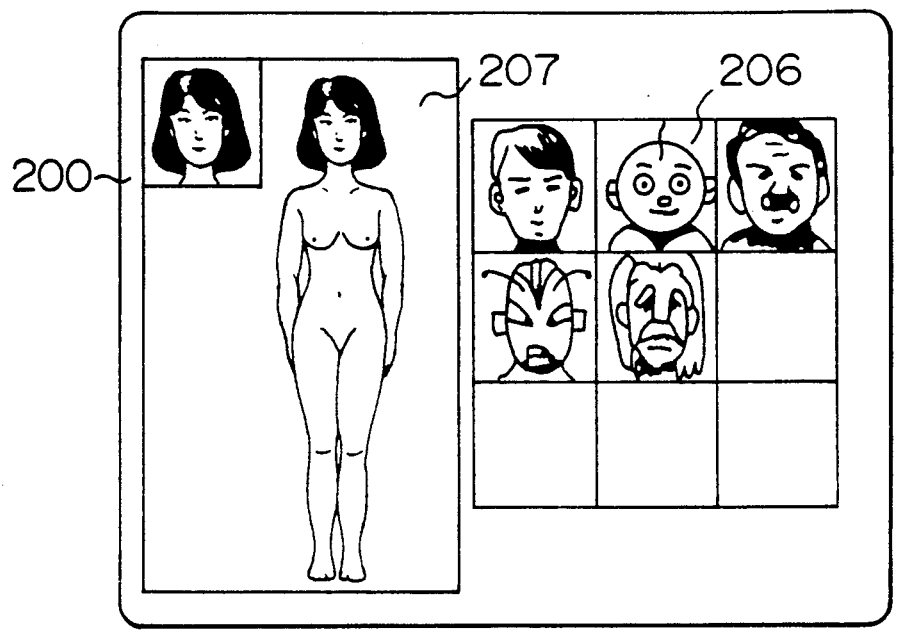

In FIG. 12, there is shown one example of conditions for retrieving the original body shape data files. Since a face portion is roughly displayed by 206 on the screen 200, the specific original body shape data 207 can be selected therefrom.

Figure 13:
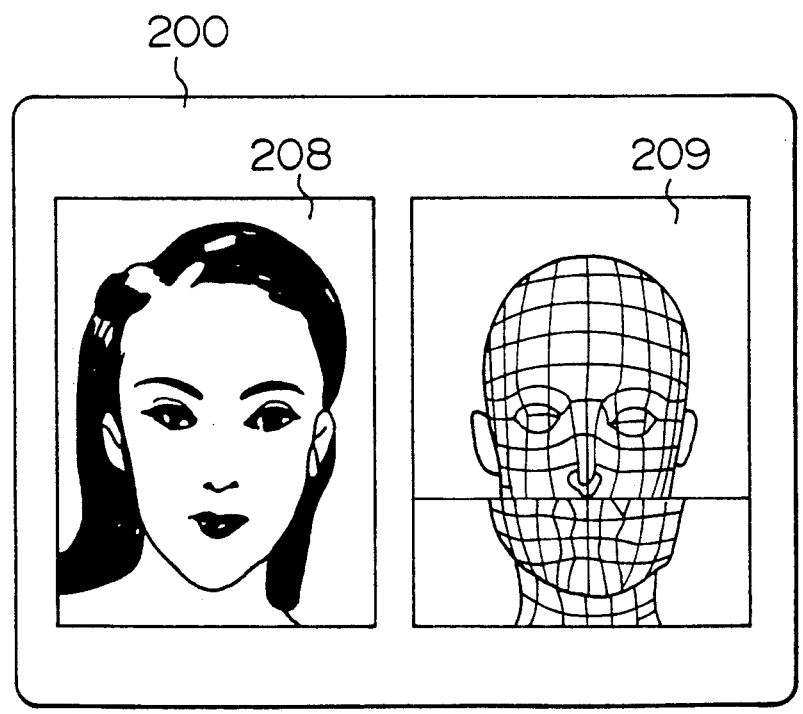

Next, a head portion is generated. Although the head portion is displayed also at the stage of the original body shape data, an example of an image when a detailed correction is performed is represented in FIG. 13. In this level, while observing a rendering image 208 of a face, outer shape data 209 is directly modified.

Figure 14:
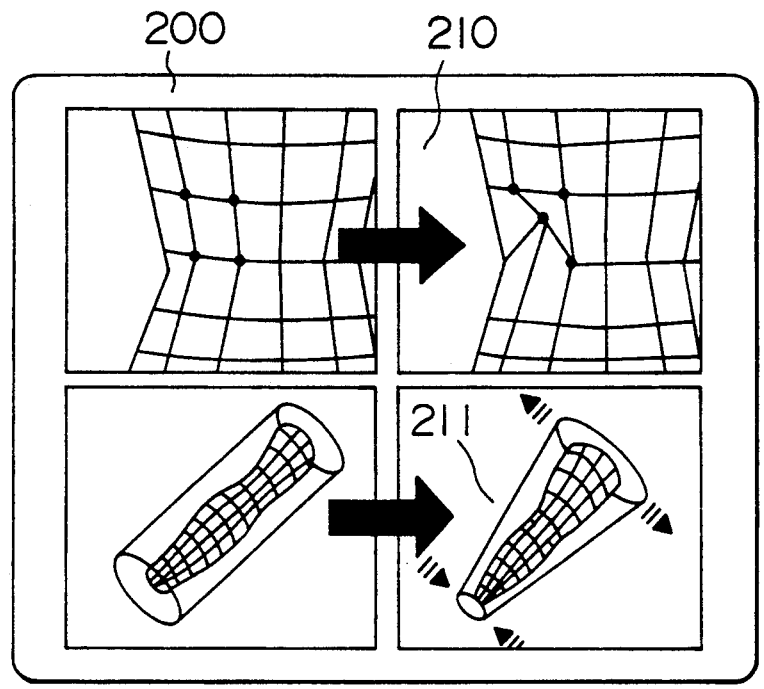
Figure 15:
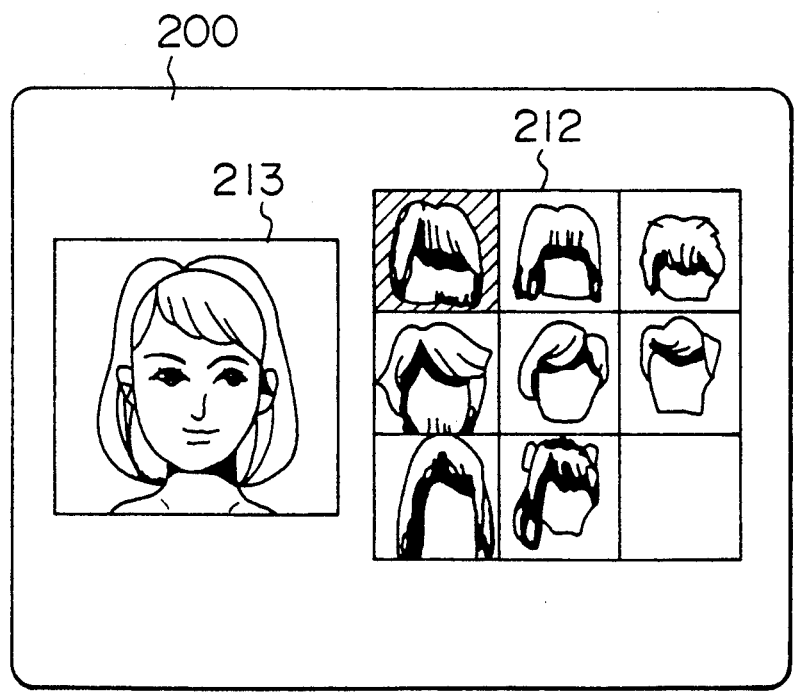

As shown in FIG. 14, a detailed portion correction or modification in a body shape is performed in a patch expansion view 210 displayed on a screen in such a manner that the modification is performed every one point, the modified results are reflected on an entire diagram 211, and such a modification is repeated while observing this entire diagram 211, whereby a head portion with personality is formed. For a head portion, hair is important. It is convenient to select the hair from the standard hair model (47 of FIG. 3). An embodiment of this hair data selection is represented in FIG. 15. A proper hair style is selected from a standard hair style icon 212, a picture 213 in which the selected hair style is dressed on a head portion model, whereby it is convenient for a producer. However, even when the hair style has been determined, personality is desirable for this head portion, given in a detailed portion thereof. FIG. 16 shows an editing screen according one embodiment in the above-described personality application operation. A selection is properly made from a hair condition icon 214 displayed on a screen 200 so as to modify a detailed portion of the head portion. In accordance with this detailed modification, a front view 215 of the head portion, a side view 216 thereof and a back view 217 thereof are displayed, so that a further modification is proceeded while observing these views. As a consequence, a human body with individuality is formed.

With the above-described operations, the human body is produced and thereafter a dress will be formed. In this case, a proper model is selected from the standard dressing model 47 constructed of the paper patterns on the like; a material of a cloth, color and pattern thereof are selected from the standard thin film model 60 and the image structure knowledge database 51, so that these selected articles may be dressed on a human body having a posture given by the strapping data 45. As a consequence, the forming work contains the calling operation from the database, the very small shape modification and the attribute inputting operation for realizing the personality. The modification of the dressing due to the posture is automatically formed.

Although accessories are not always required, since shoes, glasses, wristwatch, earrings and the like have been present as a portion of the standard dressing model 47, the accessories may be dressed with the simple selection and very small modifications.

A material feeling of makeup is also important as a portion of a face. Since the material feeling of the face is expressed by a mapping image formed by utilizing the standard thin film model 60, the two-dimensional mapping data is interactively modified. This may be realized by calling a "paint system".

Figure 18:
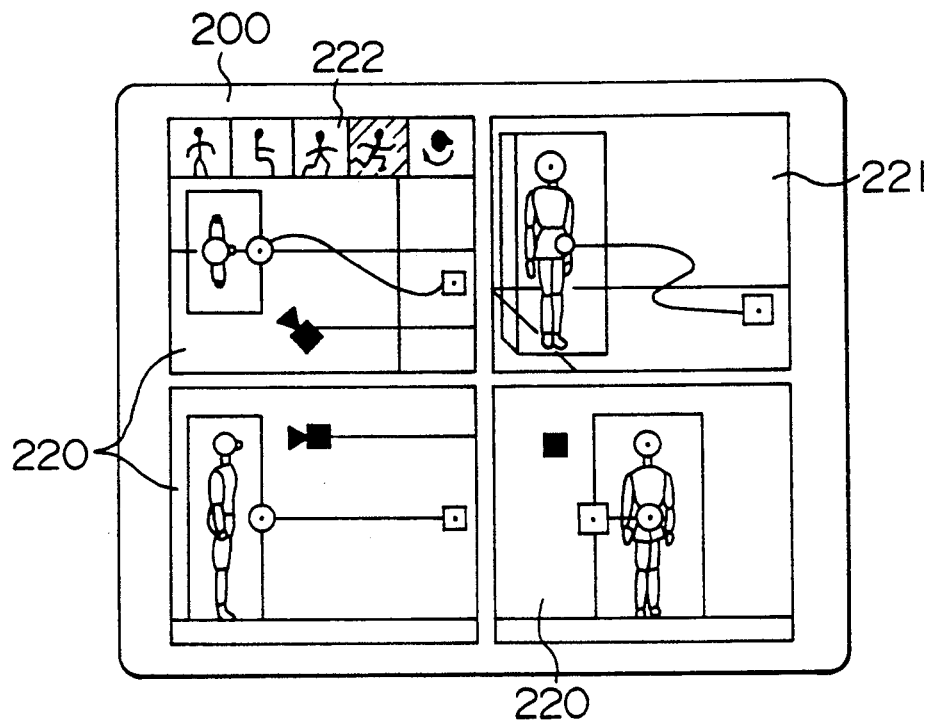
Figure 19:
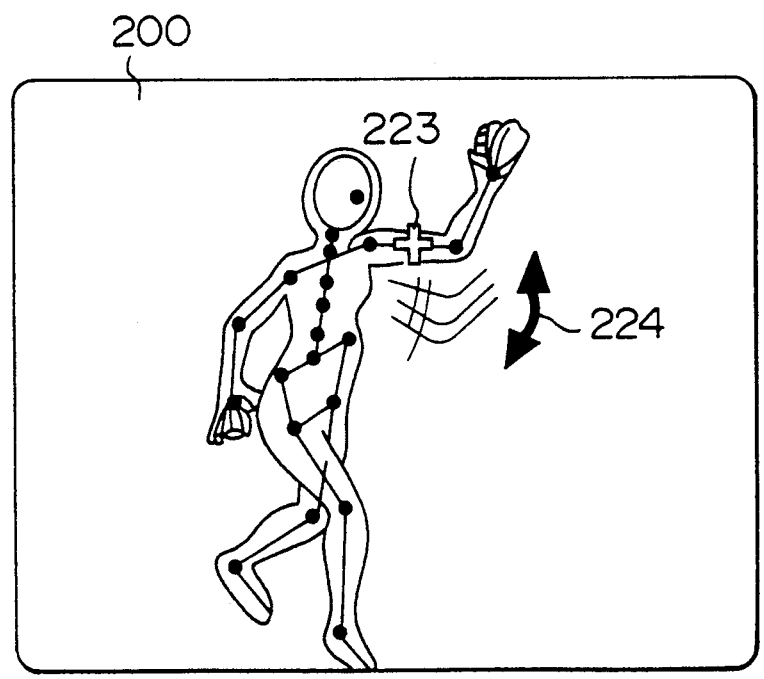
Figure 20:
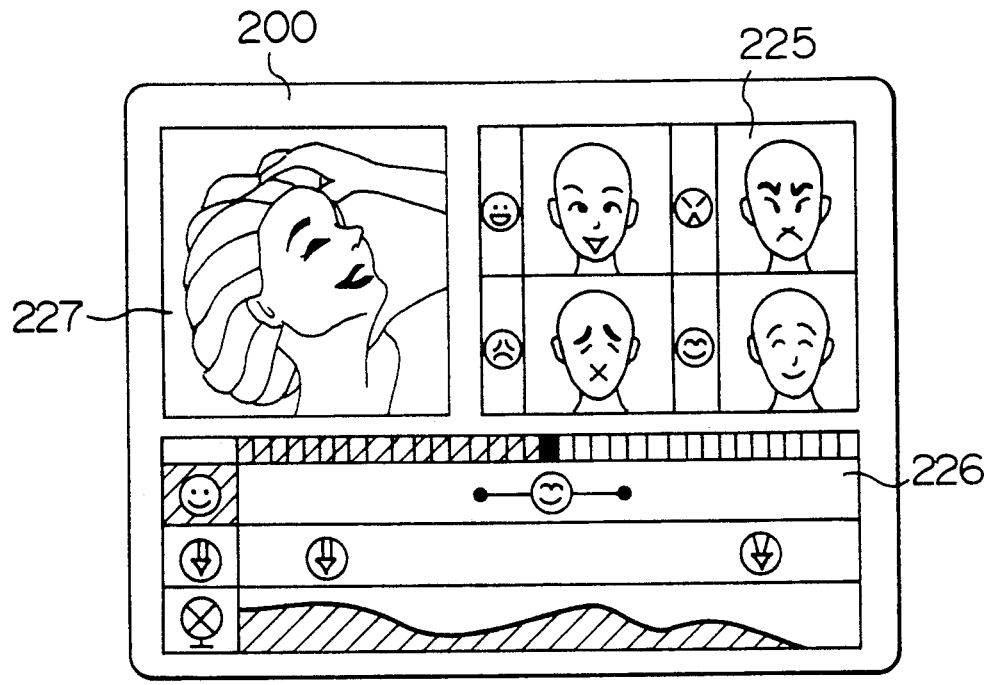

Then, motion is formed. In FIG. 3, individuality is given in the motion editor/simulator 24 by utilizing the standard operation library 26. Subsequently, it is so preset how to this motion is determined in a sequence, and where this motion is carried out. In this case, a path of the motion is set on a path setting screen displayed on the screen 200 as shown in FIG. 17. The display includes three side views 218 and a perspective view 219. As shown in FIG. 18, it is set on the editing screen on the screen 200 how to proceed with the motion on this path. It is set on the three side views 220 and the perspective view 221 where the motion starts from and ends along the path. The motion in this case is set into a motion icon 222. These are operated in accordance with the set conditions. As to the improper portion, as represented in FIG. 19, it may designate how a motion point 223 is moved, namely, it may separately designate motion conditions 224. On the other hand, an important thing among the local operations is an expression. A method for setting an expression according to an embodiment is shown in FIG. 20. It is so set what time a human body is present and what expression he has, based upon an expression icon 225 and an expression period setting 226 on the screen 200. The set contents are confirmed on a preview screen 227.

Figure 21:
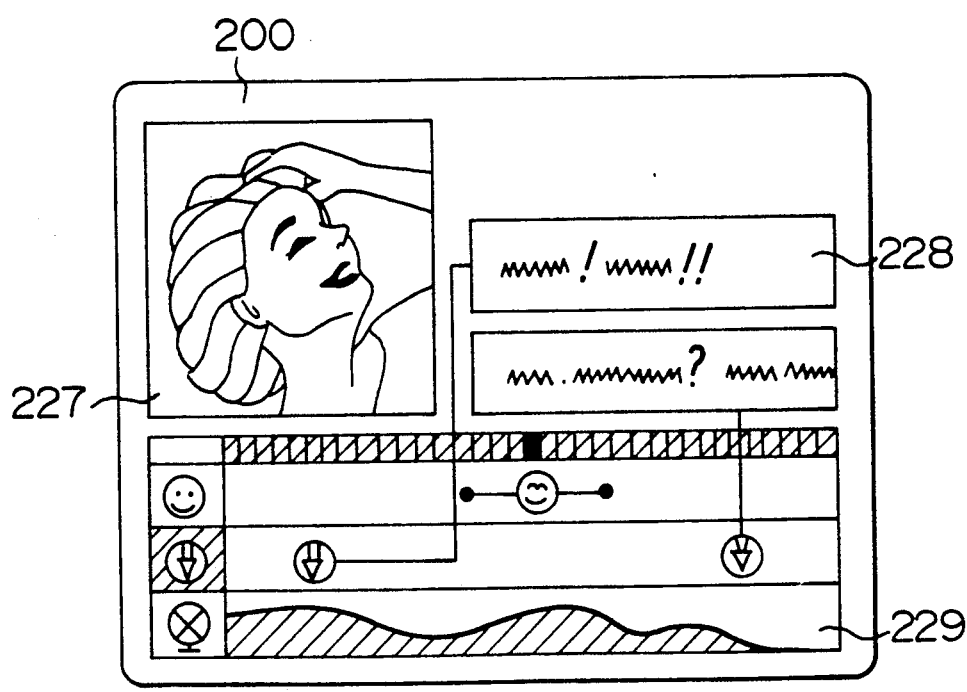

Moreover, there is a vocalization as the local operation. This vocalization is performed in such a manner that, as represented in FIG. 21, an input is made by a language into a vocalization content input 228 displayed on the screen 200, and a vocalization period is set in a vocalization period setting 229. The result is confirmed by the preview screen 227 and the sound.

As previously explained, the synthesized human image is formed which is one sort of the three-dimensional synthesized biological image. Thus, the synthesized human image may be produced in a real image by way of the rendering process. In this case, the desirable composition and color arrangement may be achieved by utilizing the rendering knowledge data base 56.

In accordance with various aspects of the present invention, since the standard data have been owned, it is not necessary to input various data in advance. Also, since the producer operated editor is employed, the biological images with the individuality can be expressed in the substantially interactive mode. That is to say, even an inexperienced person can express the synthesized biological image in a simple manner.

Also, the shape data which results in a large quantity of data may be utilized by performing the modification processes on the simple standard models.

In addition, since the complex operation may be calculated from a summation of the basic operations, light-weighting of the operation data may be realized. Further, the material feeling of the outer surface may be simply formed by way of an isotropic reflecting model.

What is claimed is:

1. A biological image formation aiding system comprising:

first data storage means for storing three-dimensional data corresponding to a shape of a biological image;

second data storage means for storing three-dimensional data corresponding to motion of the biological image;

third data storage means for storing three-dimensional data corresponding to a material feeling of an outer surface of the biological image;

editing means coupled to said first, second and third data storage means for modifying at least one of said three-dimensional data corresponding to the shape of the biological image, the motion of the biological image, and the material feeling of the outer surface of the biological image in accordance with requirements of a biological image to be produced; and output means responsive to the output of said editing means for synthesizing said three-dimensional data corresponding to the shape of the biological image, the motion of the biological image, and the material feeling of the outer surface of the biological image with each other to provide synthesized three dimensional data for forming the biological image to be produced.

2. A biological image formation aiding system comprising:

data store means for storing at least three-dimensional data corresponding to a standard shape of a three-dimensional biological image, three-dimensional data corresponding to standard motion of the biological image, and three-dimensional data corresponding to a standard material feeling of an outer surface of the biological image; and editing means for adding a personality item desired by a user of said system to at least one of said three-dimensional data corresponding to the standard shape of the biological image, the standard motion of the biological image, and the standard material feeling of the outer surface of the biological image.

3. A biological image formation aiding system comprising:

shape data storage means for storing three-dimensional data corresponding to a three-dimensional shape of a biological image;

shape-data editing means for displaying three-dimensional data corresponding to said shape of the biological image on a display means, and for modifying the three-dimensional data corresponding to the shape of the biological image on a screen;

motion data storage means for storing three-dimensional data corresponding to motion of the biological image;

motion data editing means for displaying said three-dimensional data corresponding to the motion of the biological image, and for correcting said three-dimensional data corresponding to the motion of the biological image;

outer surface material feeling data storage means for storing three-dimensional data corresponding to a material feeling of an outer surface of the biological image; and, outer surface material feeling data editing means for displaying said three-dimensional data corresponding to the material feeling of the outer surface of said biological image, and for modifying said three-dimensional data corresponding to the material feeling of the outer surface of said biological image on the screen.

4. The biological image formation aiding system according to claim 3, further comprising:

output means for synthesizing said three-dimensional data corresponding to the shape of the biological image, said three-dimensional data corresponding to the motion of said biological image and said three-dimensional data corresponding to the material feeling of the outer surface of the biological image with each other to output synthesized three-dimensional data for a biological image to be produced, and a synthesized data storage means for storing said synthesized three dimensional data.

5. The biological image formation aiding system according to claim 3, further comprising:

storage means for storing three dimensional data obtained by synthesizing said data corresponding to the shape of the biological image, said data corresponding to the motion of the biological image, and said data corresponding to the material feeling of the outer surface of the biological image.

6. The biological image formation aiding system according to claim 1, wherein said three dimensional data corresponding to the shape of the biological image represents at least one of a skeleton and a body shape of the biological image.

7. The biological image formation aiding system according to claim 1, wherein said three-dimensional data corresponding to the material feeling/shape of the outer surface of the biological image represents at least one of a hair, fur, whisker and a facial expression.

8. The biological image formation aiding system according to claim 1, wherein said three dimensional data corresponding to the material feeling/shape of the outer surface of said the biological image represents a dress of the biological image.

9. A method for producing a biological image by use of a computer, said method comprising the steps of:

storing three-dimensional data corresponding to a three-dimensional shape of a biological image;

storing three-dimensional data corresponding to three-dimensional motion of the biological image;

storing three-dimensional data corresponding to a three-dimensional material feeling of an outer surface of the biological image;

modifying at least one of said stored three-dimensional data corresponding to the shape of the biological image, said stored three-dimensional data corresponding to the motion of the biological image, and said stored three-dimensional data corresponding to the material feeling of the outer surface of the biological image in accordance with requirements of a biological image to be produced; and synthesizing said three-dimensional data corresponding to the shape of the biological image, said three-dimensional data corresponding to the motion of the biological image, and said three-dimensional data corresponding to the material feeling of the outer surface of the biological image which are modified by said modifying step, with each other to provide a synthesized data for forming the biological image to be produced.

10. A method for producing a biological image by use of a computer, said method comprising the steps of:

storing at least three-dimensional data corresponding to a standard shape of a biological image, three-dimensional data corresponding to standard motion of the biological image and three-dimensional data corresponding to a standard material feeling of an outer surface of the biological image; and attaching a personality item desired by a user of said system to at least one of said three-dimensional data corresponding to said standard shape, said three-dimensional data corresponding to the motion of the biological image, and said three-dimensional data corresponding to the material feeling of the outer surface of the biological image.

11. A method for producing a biological image comprising steps executed by a computer, said method comprising the steps of:

storing three-dimensional data corresponding to a three-dimensional shape of a biological image;

displaying said three-dimensional data corresponding to the shape of the biological image; and modifying said three-dimensional data corresponding to the three-dimensional shape of the biological image on a display screen depending upon requirements of a biological image to be produced;

storing three-dimensional data corresponding to three-dimensional motion of the biological image;

displaying said three-dimensional data corresponding to the three-dimensional motion of the biological image;

modifying said three-dimensional data corresponding to the biological image on the display screen depending upon requirements of said biological image to be produced;

storing three-dimensional data corresponding to a three-dimensional material feeling of an outer surface of the biological image;

displaying said three-dimensional data corresponding to the three-dimensional material feeling of the outer surface of the biological image; and modifying said three-dimensional data image corresponding to the material feeling of the outer surface of the biological image on the display screen depending upon said requirements of said biological image to be produced.

12. The biological image producing method according to claim 11, further comprising a step of synthesizing said three-dimensional data corresponding to the shape of the biological image, said three-dimensional data corresponding to the motion of said biological image, and said three-dimensional data corresponding to the material feeling of the outer surface of said biological image with each other to output a synthesized data for said biological image to be produced.

13. The biological image producing method as claimed in claim 11, further comprising a step of storing synthesized three-dimensional data obtained by synthesizing said three-dimensional data corresponding to the shape of the biological image, said three-dimensional data corresponding to the motion of the biological image, and said three-dimensional data corresponding to the material feeling of the outer surface of the biological image.

14. The biological image producing method as claimed in claim 9, wherein said three dimensional data corresponding to the shape of the biological image represents at least one of a skeleton and a body shape of the biological image.

15. The biological image producing method according to claim 9, wherein said three dimensional data corresponding to the material feeling/shape of the outer surface of said biological image represents at least one of a hair, fur, whisker and a facial expression.

16. The biological image producing method according to claim 9, wherein said three dimensional data corresponding to the material feeling/shape of the outer surface of said biological image represents a dress of the biological image.

* * * * *